United States Patent
Allali (10) Patent No.: US 9,987,911 B2
(45) Date of Patent: Jun. 5, 2018

(54) OPEN ROOF CONSTRUCTION FOR A VEHICLE

(71) Applicant: INALFA ROOF SYSTEMS GROUP B.V., Venray (NL)

(72) Inventor: Taha Allali, Rochester Hills, MI (US)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days. days.

(21) Appl. No.: 15/047,433

(22) Filed: Feb. 18, 2016

(65) Prior Publication Data

US 2017/0240035 A1    Aug. 24, 2017

(51) Int. Cl.
| | |
|---|---|
| *B60J 10/24* | (2016.01) |
| *B60J 10/90* | (2016.01) |
| *B60J 10/18* | (2016.01) |
| *B60J 10/248* | (2016.01) |
| *B60J 10/82* | (2016.01) |

(52) U.S. Cl.
CPC .............. *B60J 10/90* (2016.02); *B60J 10/18* (2016.02); *B60J 10/248* (2016.02); *B60J 10/82* (2016.02)

(58) Field of Classification Search
CPC ... B60J 10/82; B60J 7/022; B60J 7/043; B60J 7/0435; B60J 7/1642; B60J 10/248; B60J 7/0084; B60J 7/0573
USPC .......... 296/216.07, 214, 218, 223, 206, 191, 296/201, 187.13, 901.01
See application file for complete search history.

(56) References Cited

U.S. PATENT DOCUMENTS

| | | | | |
|---|---|---|---|---|
| 5,950,366 | A * | 9/1999 | Uhlmeyer | B60J 10/248 296/213 |
| 6,820,372 | B2 * | 11/2004 | Nozaki | B60J 10/24 49/492.1 |
| 6,857,684 | B2 * | 2/2005 | Worley | B60J 7/146 296/100.06 |
| 7,380,862 | B2 * | 6/2008 | Olney | B60J 10/90 296/107.04 |

(Continued)

FOREIGN PATENT DOCUMENTS

| | | |
|---|---|---|
| DE | 8711587 U1 | 10/1987 |
| DE | 10038498 A1 | 2/2002 |
| DE | 102005033276 B3 | 10/2006 |

OTHER PUBLICATIONS

European Search Report and Written Opinion for European patent application No. 17152807, dated Sep. 25, 2017.

*Primary Examiner* — D Glenn Dayoan
*Assistant Examiner* — Sunsurraye Westbrook
(74) *Attorney, Agent, or Firm* — Steven M. Koehler; Westman, Champlin & Koehler, P.A.

(57) ABSTRACT

An open roof construction is provided for a vehicle having an opening in a fixed roof where the fixed roof has a roof edge defining the opening and protruding in a downward direction and further comprises a stationary part, at least one panel for at least partly opening and/or closing the roof opening. The panel is movable in vertical and longitudinal directions with respect to the roof opening. The stationary part is provided with sealing assembly comprising a first seal part capable of sealing the panel towards the fixed roof part, and a second seal part capable of sealing the stationary part against an inner part of the fixed roof and wherein the sealing assembly further comprises a third seal part capable of sealing the stationary part against a lower part of the roof edge.

18 Claims, 13 Drawing Sheets

(56) References Cited

U.S. PATENT DOCUMENTS

| | | | |
|---|---|---|---|
| 8,020,928 B2* | 9/2011 | Kuribayashi | B60J 7/22 |
| | | | 296/214 |
| 8,752,888 B2* | 6/2014 | Chung | B60J 7/043 |
| | | | 296/216.06 |
| 8,919,870 B2* | 12/2014 | Misono | B60J 7/226 |
| | | | 296/216.07 |
| 2009/0115227 A1 | 5/2009 | Radmanic | |

* cited by examiner

Detail D

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle having a roof opening in a fixed roof part, the fixed roof having a roof edge defining the roof opening and protruding in a downward direction and further comprising a stationary part, and at least one panel for at least partly opening and closing the roof opening, the panel being movably supported by an operating mechanism, guided in a guide rail of the stationary part, extending along a longitudinal side of the roof opening, the panel being movable in vertical and longitudinal directions with respect to the roof opening, the stationary part being provided with sealing assembly comprising a first seal part capable of sealing the panel towards the fixed roof part, and a second seal part capable of sealing the stationary part against an inner part of the fixed roof.

Such open roof construction is known in the art whereby the sealing assembly further comprises a protruding part with which the sealing assembly is mounted to the stationary part. A drawback of this sealing assembly is that the tolerances between the stationary part carrying the sealing assembly and the fixed body outer surface are such that the appearance of the first seal part is depending on the amount of the tolerance stack between these parts. As such the visual impression of the sealing assembly seen from the outside of the vehicle and also the sealing function as such may be compromised in the vehicle. In such case in one vehicle the sealing assembly may look wavy from the outside or is protruding outward from the vehicles roof surfaces. And also the visual impression of the seal may vary from vehicle to vehicle under influence of the different tolerances in each vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An open roof construction according to an aspect of the invention is characterized in that the sealing assembly further comprises a third seal part capable of sealing the stationary part against a lower part of the roof edge.

Due to the construction of this type of seal it is possible to have three sealing functions combined in one part which is more cost effective and also solves the problem of the prior art sealing assembly of compromised visual appearance and functional sealing quality.

The third sealing part seals the gap between the stationary part and the lower part of the roof edge in such a way that this third seal part seals this gap in the range between a minimum and a maximum of the tolerance stack between the stationary part and the outside surface of the fixed roof. The third seal part provides an inherent biasing function (explained below) which enables an upper part of the third seal part to be engaged to the lower part of the roof edge under all circumstances. On this upper part of the third seal part the first and second seal parts are attached. So the first and second seal part extend in a substantially vertical direction adjacent to either side the roof edge. As such the tolerance stack path between the stationary part and the upper surface of the fixed body is now greatly reduced to a tolerance stack path between the upper part of the third seal part (engaging the lower part of the roof edge) and the upper surface of the fixed body. Now the tolerance path is easy to control by matching the tolerance of the height of the first seal part in a substantially vertical direction with the height in vertical direction of the roof edge, which results in an improved visual and functional sealing assembly. A further advantage is that the sealing assembly leads to an improved noise isolation for the occupants in the interior of the vehicle and further it creates a possibility to drain leakage water that may come from the outside of the vehicle along the first seal part towards suitable drainage members.

In one embodiment the first and third seal parts are bulb seal parts having a substantially elongated spherical shape and wherein the second seal part has an elongated shape.

Each of the seal parts is formed in a shape which enables its function in the most optimal manner. The first seal part has a substantially spherical shape in combination with a laterally extending elongated part connected to an upper part of the first seal part. This is an optimal shape for sealing between the stationary roof edge and the moving panel.

The second sealing part has an elongated shape engaging with the inner part of the fixed roof. When the sealing assembly, which is pre-assembled to the open roof construction, is assembled/mounted in the vehicle, this second sealing part is sealing this stationary gap during the rest of the lifetime of the vehicle and as such acts as an integrated secondary seal with regard to noise from outside of the vehicle towards the interior. Further it forms with the first seal part a drainage gutter in between the sealing parts, in which leakage water may be caught coming from the outside of the vehicle. This leakage water may be transported in longitudinal direction forward or rearward along the gutter in the sealing assembly towards a suitable drainage piece attached to or engaged with the sealing assembly. The drainage member is capable of draining water to the exterior of the car.

The third seal part is subjected to varying distances resulting from a tolerances stack between the stationary part and the lower part of the roof edge while maintaining a closed gap between said parts. In this way, despite the sometimes large tolerance stacks between the open roof construction and the vehicle body, in individual cases, the third seal part adapts to the dimension of the gap between the stationary part and the lower part of the roof edge in an assembled/mounted condition. This is achieved under the influence of an inherent biasing function in a substantially vertical direction in such a way that within the maximum and minimum of the total tolerance stack requirement between these parts the third seal part maintains its sealing function and seals the gap between these parts. The advantage is that due to this sealing function the noise sealing or isolation (for instance wind noise) is improved, such that the path for noise coming from the exterior side of the vehicle, which may enter along the first seal part is now obstructed by the sealing function of the third sealing part towards the lower part of the roof edge.

The sealing assembly is mounted to the stationary part and the third seal part is biased in a direction towards the lower part of the roof edge to maintain a sealing against said lower part of the roof edge. This biasing function deployed by the third seal part is necessary because the sealing between this part and the lower part of the roof edge needs to be maintained during life time of the vehicle. Also it may be the case that the gap between the stationary part and the lower part of the roof edge is varying along the length of the sealing assembly within one vehicle. The biasing function of the third seal part is laid out such that the biasing effect occurs flawlessly within the minimum and maximum boundaries of the tolerance stack requirements along the extension of the sealing assembly.

The third seal part comprises a lower part provided with a protruding part by which the sealing assembly is mounted to the stationary part and the upper part extending in a substantially horizontal direction, and further comprises lateral side parts connecting the lower part with the upper part, and wherein said upper part is provided with the first and second seal parts and said upper part is biased against the lower part of the roof edge, said upper part being substantially stiff in order to avoid any deflection of said upper part. It is important that the upper part stays stiff during lifetime to maintain the proper position of the first and second seal part such that both the visual impression and sealing function of these parts are not compromised.

To ensure the stiffness of the upper part of the third seal part in another embodiment, the upper part comprises a reinforcement integrated into the material to enhance the stiffness of said upper part. The reinforcement for instance can be made of a steel strip or a thermoplastic strip, and gives additional stiffness to the upper part to avoid deflection under the influence of the biasing force which the third seal part may apply.

In yet another embodiment the third seal part comprises a reinforcement in the form of a C-shaped spring, capable of enhancing the biasing force of the third seal part to the lower part of the roof edge. Such a spring is for instance made of spring steel or carbon fiber reinforced plastic and may be able to enhance the biasing force of the third seal part.

In another embodiment the third seal part and the first seal part comprise a reinforcement integrated in the material. Next to the enhancement of the stiffness of the upper part of the third seal part also the support of the position of the first seal during opening and closing of the panel is enhanced. In this embodiment the support of the first seal part in a substantially lateral direction is enhanced by the reinforcement, especially with respect to the forces that the panel applies on the seal when the panel moves from the closed position to an open position and vice versa towards the closed position.

In yet another embodiment the second seal part and the third seal part comprise a reinforcement integrated in the material to enhance the stiffness of the upper part of the second seal part and to support the position of the second seal part towards the inner side of the fixed roof. Also it is possible to have a combination of aforementioned embodiments wherein a reinforcement supports the first and second seal part via the upper part of the third seal part. As such both first and second seal parts are supported to perform their specific functions and the upper part of the third seal is reinforced to avoid deflection of the upper part.

The sealing assembly may be manufactured in an extrusion process or a molding process and comprises a material selected from the group of materials known as TPE (thermoplastic elastomers) and/or the group known as EPDM (ethylene propylene diene monomers). In a preferred embodiment the sealing assembly are manufactured in an extruding process whereby components of either group of materials are used, in different hardnesses.

Specifically the upper part of the third seal part comprises an increased hardness in comparison to the remainder of the sealing assembly to enhance the stiffness of the upper part. This is essential to the performance of visual impression and the sealing, since a deflection of the upper part for instance by both end parts of the upper part would mean that the first seal part would be protruding too far outwardly of the upper fixed roof surface which would compromise the visual impression and the sealing quality.

In yet another embodiment the wall thickness of the upper part and the lateral side parts of the third sealing part may be increased such that the stiffness of the upper part is enhanced and/or that the biasing force of the upper part is enhanced.

In another embodiment the hollow inner part of the third seal part is filled with a cellular rubber from the group of materials known as EPDM, having a low density. The cellular rubber applies a biasing force that enables the upper part to be pressed against the lower part of the roof edge.

In a further embodiment the third seal part comprises in between the lateral side parts a connection part between the lower and the upper part, said connection part being formed such that it is able to deflect in a lateral direction under the influence of the biasing force of the third seal part and compression caused by it.

In yet another embodiment the third seal part, in the area where the upper part engages the lower part of the roof edge, may be provided with a predefined channel to receive the shape of the lower part of the roof edge in the appropriate position as seen in a lateral direction. The channel may facilitate the mounting or assembly of the complete roof system including the sealing assembly to the body of the vehicle. This is especially beneficial in case where the distance between the first and second seal is substantially larger than the thickness of the lower part of the roof edge. When the distance between the connections of the first and second seal part with the upper part of the third seal part is made smaller such that the width of the lower part of the roof edge just fits in between, as such the predefined channel is created by the first and second seal parts.

In another embodiment the sealing assembly in the area between the connections of the first and the second seal to the upper part of the third seal part forms a drain gutter able to collect water which may leak from the first sealing part between the panel and the fixed roof and wherein the sealing assembly at each longitudinal end is connected to a drainage member capable of exiting the water from the drain gutter towards the exterior of the vehicle body. Since in the majority of vehicles, the fixed roof surface has a curved shape as seen in a vertical longitudinal plane, and therewith the end part of the roof edge also has a curved shape, the formed drain gutter runs also in a curved manner as seen in a vertical longitudinal planar view. Any leakage water in the drain gutter may run either to the front or the rear of the vehicle towards an end of the longitudinally extending sealing assembly and be drained into a drainage water connector.

The sealing assembly may extend in a longitudinal direction on the longitudinal sides of the roof opening, however the sealing assembly may also run along the complete circumference of the roof opening such that the means also extend in lateral direction.

With respect to what has been explained before of the present invention, the fixed roof part can also be a separate part from the body being a roof finisher having a similar shape with a downwardly extending roof edge.

The orientation of the sealing assembly in a preferred embodiment extends from a lower part of the third seal part assembled to a stationary part in a substantially vertical direction to the first and second seal parts, however in another embodiment the orientation of the sealing assembly may extend in another direction, for instance in a horizontal lateral outward or inward direction with respect to the vehicle body.

In a preferred embodiment the steel or plastic reinforcements are integrated into the rubber material of the sealing assembly, however it is also achievable that the reinforcements are separate parts that are connected to the exterior side of the sealing assembly.

BRIEF DESCRIPTION OF THE DRAWINGS

Aspects of the invention will further be explained with reference to the drawings showing embodiments of the open roof construction by way of example.

DETAILED DESCRIPTION OF ILLUSTRATIVE EMBODIMENTS

Figure 1:
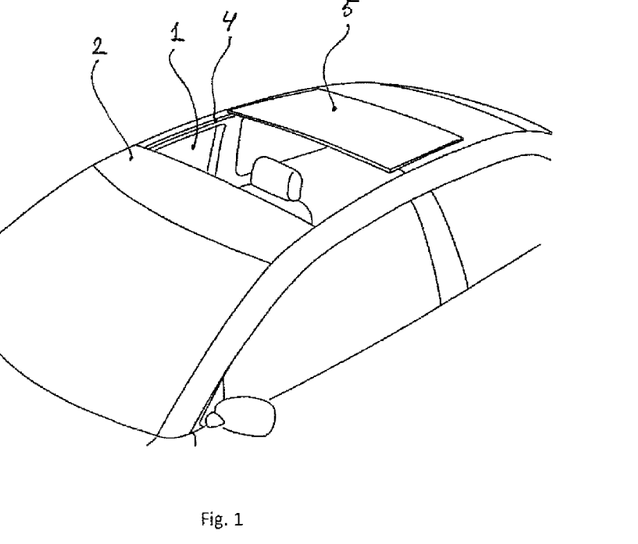
FIG. 1 is an isometric perspective view of the upper part of a vehicle in which an open roof construction is provided.
Figure 2:
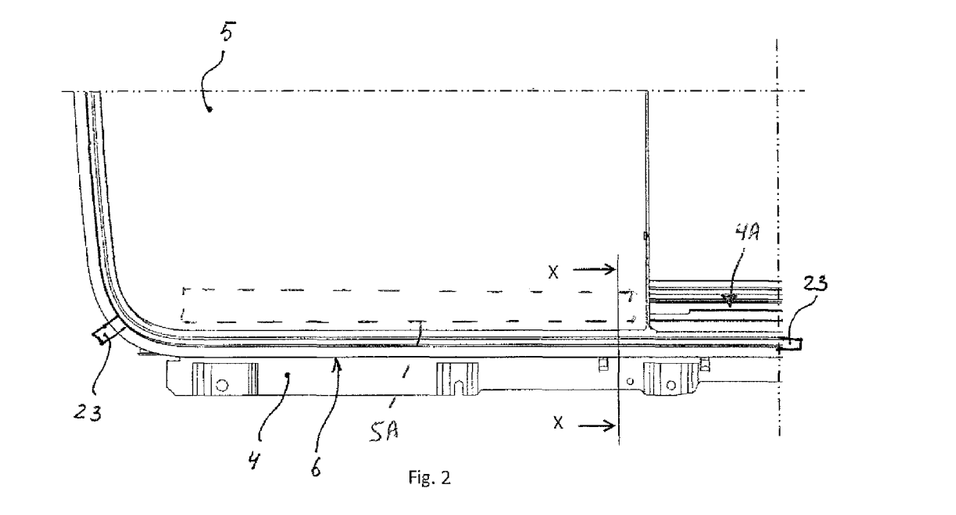
FIG. 2 is a plan view showing a part of the open roof construction in isolation from the vehicle body.
Figure 4:
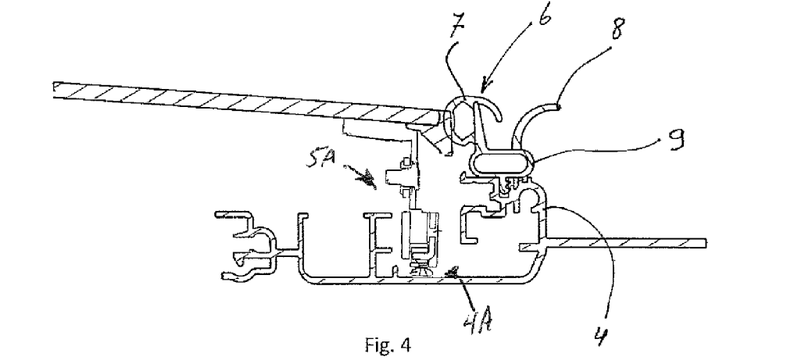
FIG. 4 is a sectional view similar to FIG. 3, wherein the sealing assembly is drawn in a maximum extended shape without the fixed roof line.

FIG. 1 shows a vehicle such as a passenger car or a utility vehicle provided with an open roof construction having a roof opening 1 in a fixed roof 2 and at least one panel 5 for at least partly opening and/or closing the roof opening 1, the panel 5 being movably supported by an operating mechanism 5A schematically illustrated in FIGS. 2 and 4. The operating mechanism 5A is guided in a guide rail 4A of the stationary part 4 extending along at least a longitudinal side of the roof opening 1. The operating mechanism 5A moves the panel 5 in vertical and longitudinal directions with respect to the roof opening 1. Such operating mechanisms are well known and the details of it are not necessary for understanding of the open roof construction disclosed herein. Generally, the operating mechanism comprises a slide movable by a drive cable or the like, the drive cable being connected to an electric motor or hand crank. The slide includes pivoting levers, links and other structural components to move the panel 5 as desired. The open roof construction can be of the type whereby the panel 5 slides to an open position at the exterior side of the vehicle body, but it can also be of the type whereby the panel 5 slides to an open position at the interior side of the body.

FIG. 2 shows the open roof construction in a plan view, showing the panel 5 and part of the stationary part 4. Here the sealing assembly 6 is shown which in said view runs along a longitudinal side of the roof opening 1 (along the longitudinal side edge of the panel 5) towards the front of the roof opening 1 and panel 5. The open roof construction may comprise just one panel 5, but may have one or more rear panels, whereby the rear panels may be fixed to the stationary part 4 or directly to the vehicle body or may be movable too.

Figure 3:
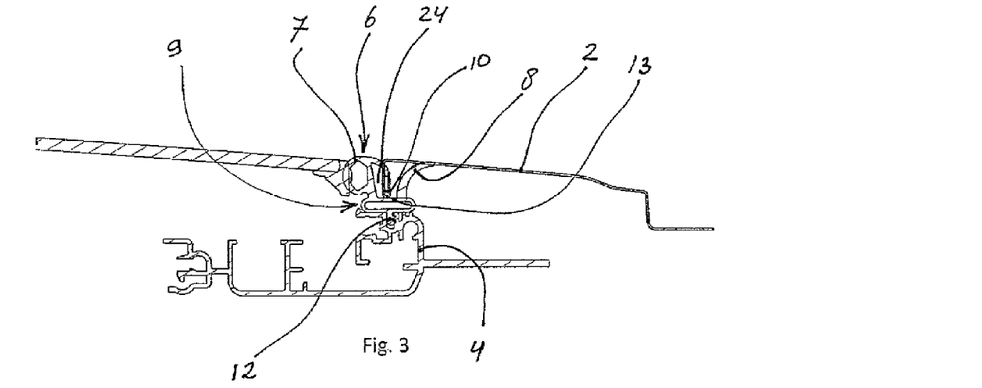
FIG. 3 is a sectional view of the open roof construction, along line X-X in FIG. 2, further showing the sealing assembly and the fixed roof, whereby the sealing assembly is drawn in a nominal tolerance stack situation.

In FIG. 3 the sealing assembly 6 is shown in more detail. The sealing assembly 6 in the area between the connections of the first and the second seal part 7, 8 to the upper part 13 of the third seal part 9 forms a drain gutter 24 able to collect water which may leak along the first sealing part 7 between the panel 5 and the fixed roof 2 and wherein the sealing assembly 6 at each longitudinal end is connected to a drainage member 23 capable of exiting the water from the drain gutter 24 (as can be seen from FIG. 2). Such drainage member 23 may also be located or connected somewhere along the extended length of the sealing assembly 6; this could be done by creating a hole in the gutter 24 right at the location of the drainage member 23. An example of this is also shown in FIG. 2.

FIG. 3 shows the sealing assembly 6 in an assembled condition. The sealing assembly 6 is mounted to the stationary part 4 by means of a part 12 protruding from the lower part 11 of the third seal part 9. This protruding part 12 engages into a channel provided in the stationary part 4. The third seal part 9 is fitted between the stationary part 4 and the lower part 10 of the roof edge 3 and applies a biasing force towards the lower part 10 of the roof edge 3. In this particular assembled condition shown in FIG. 3 the tolerance stack between the stationary part 4 and the top surface of the fixed body is nominal. The biasing effect applied by the third seal part 9 ensures that the gap is closed between the stationary part 4 and the lower part 10 of the roof edge 3. This position of the upper part 13 of the third seal part 9, which is connected to the first and second seal part 8, ensures for both the first and second seal part 8 a proper position in vertical direction. This means that the top part of the first seal part 7 lies in a flush condition with the upper part of the fixed roof 2, and the second seal part 8 is properly pressed against the inner part of the fixed roof 2.

Figure 5:
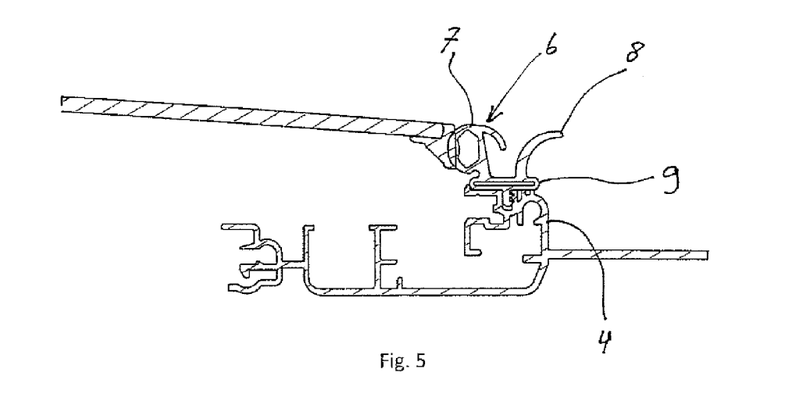
FIG. 5 is a sectional view similar to FIG. 3, wherein the sealing assembly is drawn in a minimum extended shape without the fixed roof line.

FIG. 4 shows the sealing assembly 6 in a free condition (not assembled to the vehicle body), whereby the third seal part 9 is shown in a maximum expanded shape. In case the open roof construction is assembled in the vehicle (condition not shown in FIG. 4), and the tolerance stack between stationary part 4 and upper side of the fixed body 2 is at its maximum boundary, the third seal part 9 by its inherent biasing force is still capable of closing the gap between these parts. On the other hand as shown in FIG. 5, if the tolerance stack is at its minimum boundary the third seal part 9 is still able to close the gap between the stationary part 4 and the lower part 10 of the roof edge (roof edge and body part not shown here). The forces applied by the elements to fix the stationary part 4 to the vehicle body are capable of compressing the third seal part 9 between the stationary part and the lower part of the roof edge.

Figure 6:
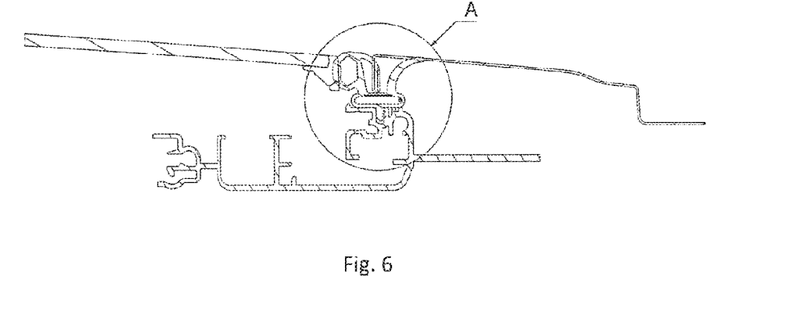
FIGS. 6,8,10,12,14,16,18,20,22,24,26 are sectional views taken along the line X-X in FIG. 2 showing the various embodiments of the sealing assembly in a build-in situation.
Figure 7:
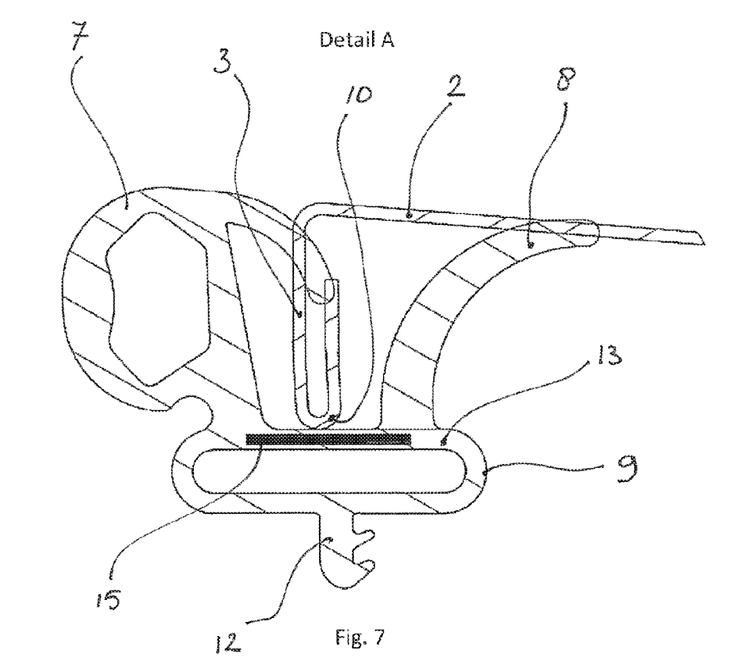
FIGS. 7,9,11,13,15,17,19,21,23,25,27 are sectional views taken along the line X-X in FIG. 2 showing a close-up of the sealing assembly and in particular showing the various embodiments in detail.

FIGS. 6 and 7 show an embodiment whereby the upper part 13 of the third seal part 9 is reinforced by a strip of either steel or reinforced plastic. This reinforcement 15 ensures that the upper part 13 of the third seal is substantially stiff. This is to avoid deflection of the upper part 13. The reinforcement 15 is integrated into the rubber material.

Figure 8:
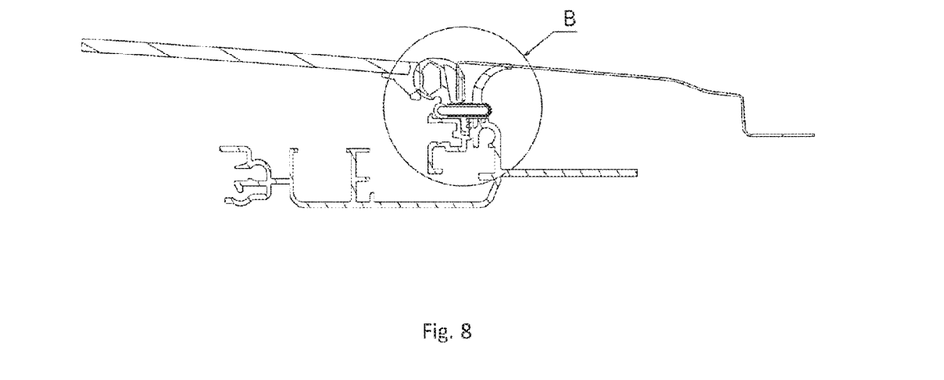
Figure 9:
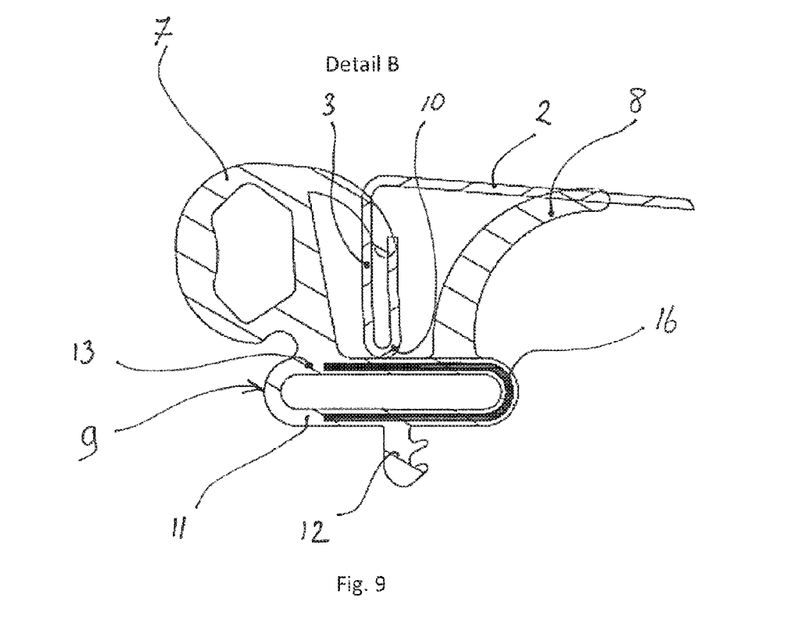

FIGS. 8 and 9 show another embodiment whereby the upper part 13 and lower part 11 of the third seal part 9 are reinforced by means of a C shaped clip. This type of reinforcement 16 may extend along the sealing assembly 6 continuously or intermittently and ensures a constant biasing force of third seal part 9 between the stationary part 4 and the lower part 10 of the roof edge 3

Figure 10:
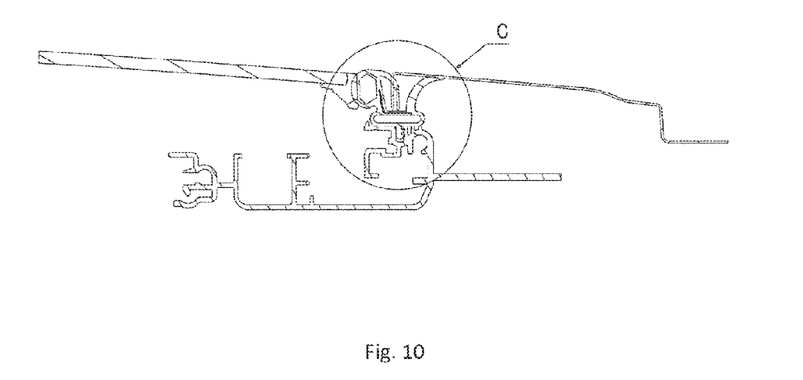
Figure 11:
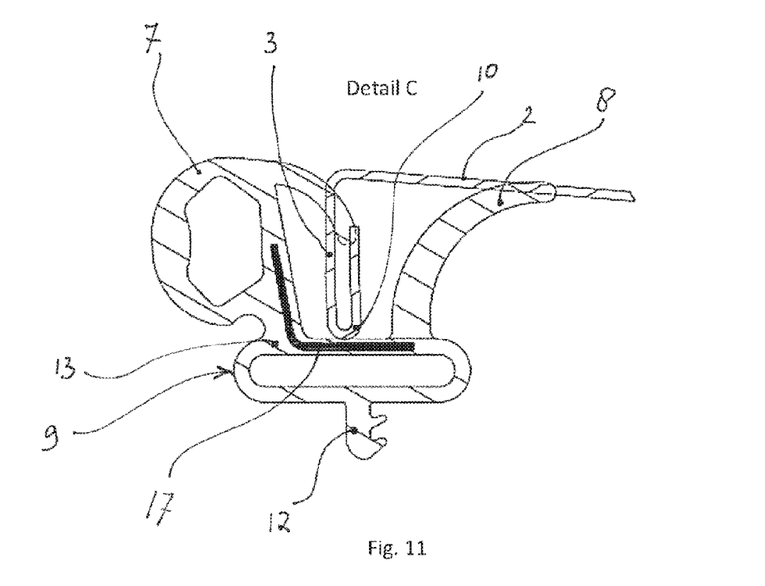
Figure 24:
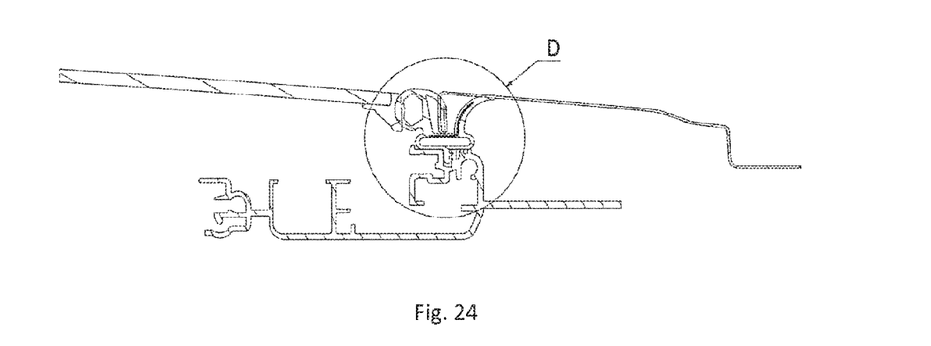
Figure 25:
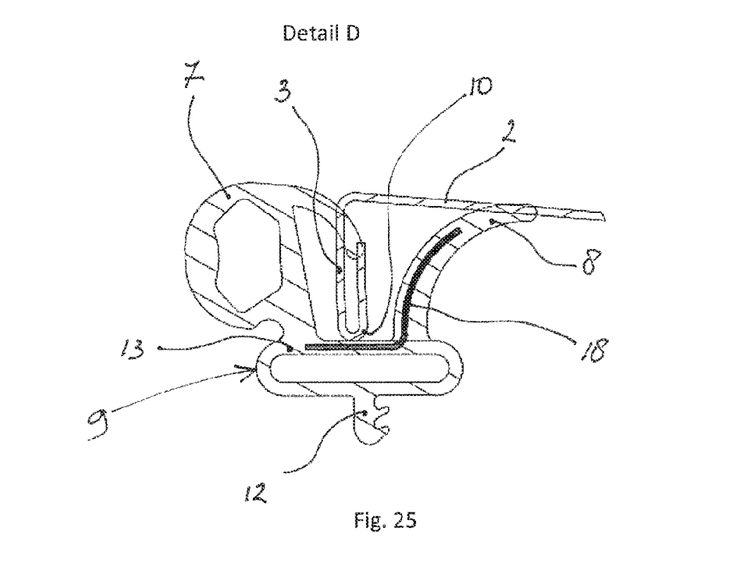
Figure 26:
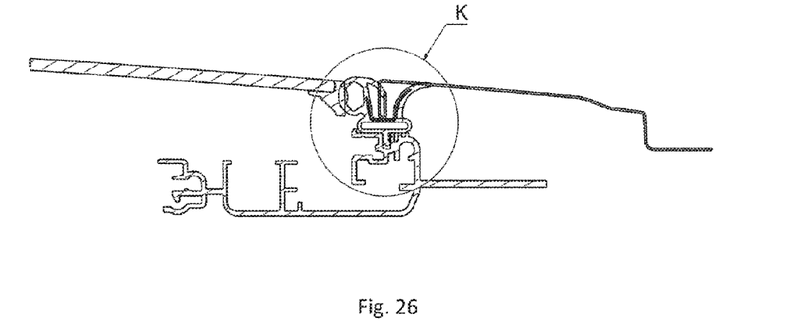
Figure 27:
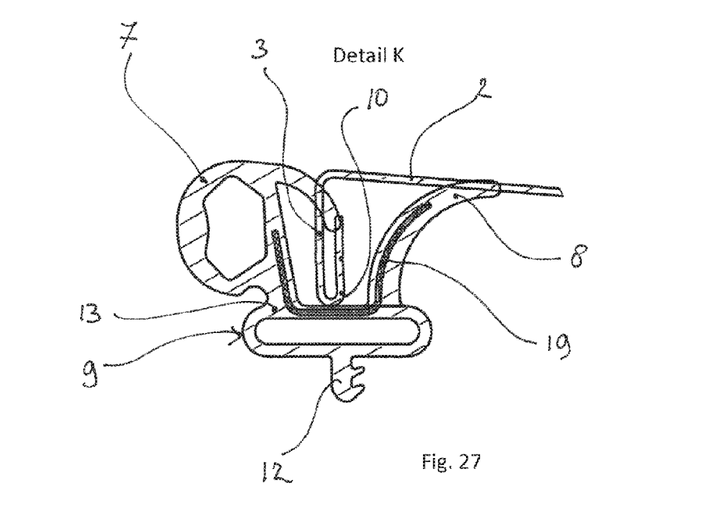

FIGS. 10 and 11 show an embodiment whereby the upper part 13 of the third seal part 9 and the first seal part 7 are reinforced by an angled shaped reinforcement 17 which can be made of steel or reinforced plastic. The reinforcement 17 is integrated into the rubber material. In FIGS. 24 and 25 a similar embodiment is shown whereby the reinforcement 18 extends from the upper part 13 of the third seal part 9 into the second seal part 8. In FIGS. 26 and 27 a combination of the last two embodiments is shown wherein the reinforcement 19 extends from the upper part 13 of the third seal part 9 into both the first and second seal part 7, 8. In these last three embodiments the reinforcements 17, 18, 19 ensure that the upper part 13 of the third sealing part stays stiff and does not deflect during life time of the sealing assembly 6 in the vehicle.

Figure 12:
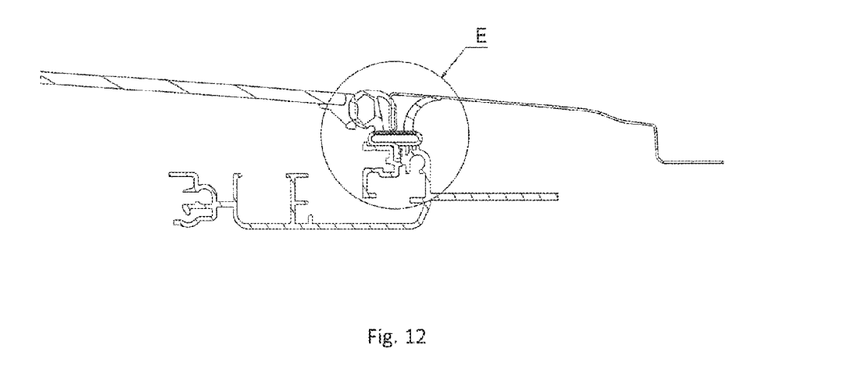
Figure 13:
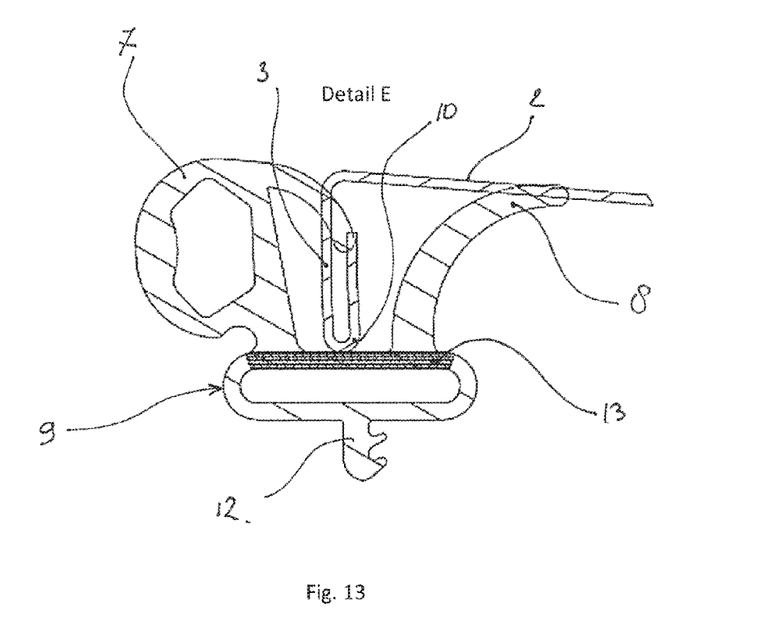
Figure 14:
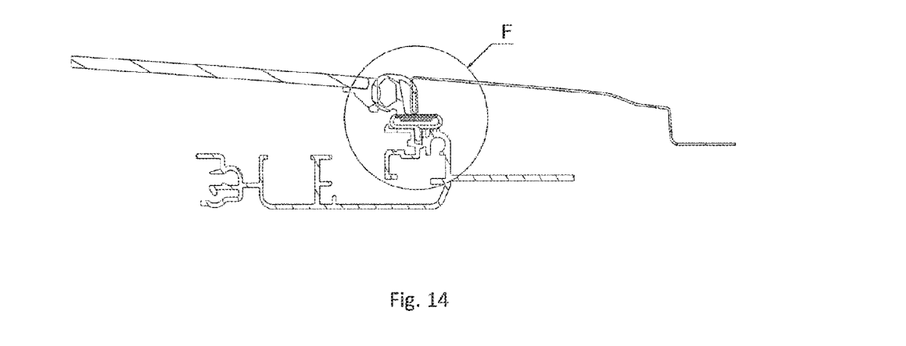
Figure 15:
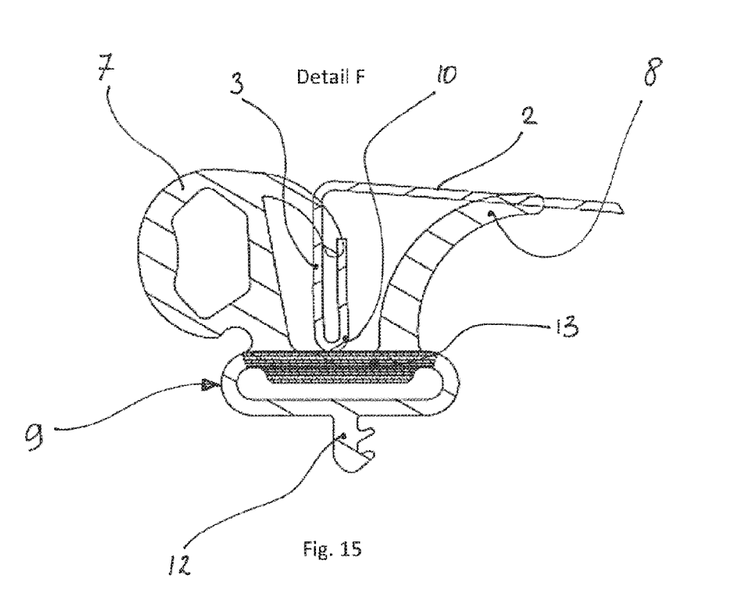

In FIGS. 12 and 13 an embodiment is shown wherein the upper part 13 of the third seal part 9 is made of a substantially harder rubber to ensure that this part remains stiff during its lifetime in the vehicle. In FIGS. 14 and 15 the embodiment shown provides the same effect, caused by making this upper part 13 of the third seal part 9 thicker to create more stiffness.

Figure 16:
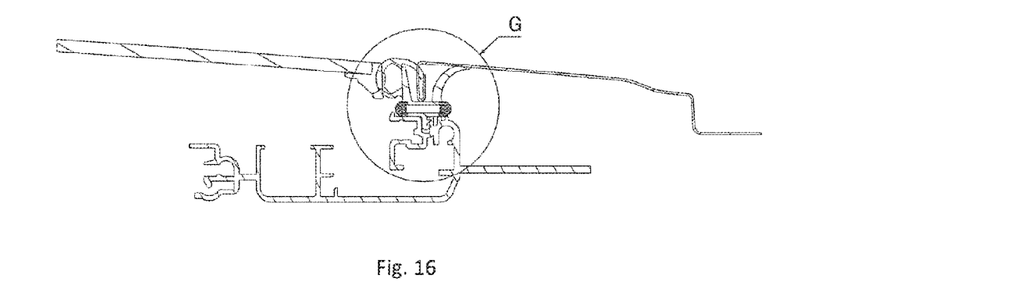
Figure 17:
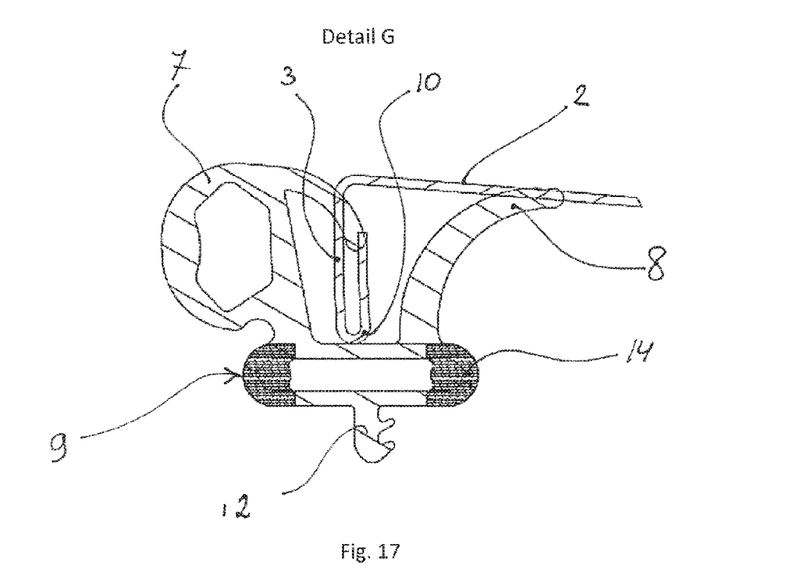

In FIGS. 16 and 17 the embodiment shown provides thicker side parts 14 of the third seal part 9 which can be done with the same rubber material or with another type of material having a different hardness.

Figure 18:
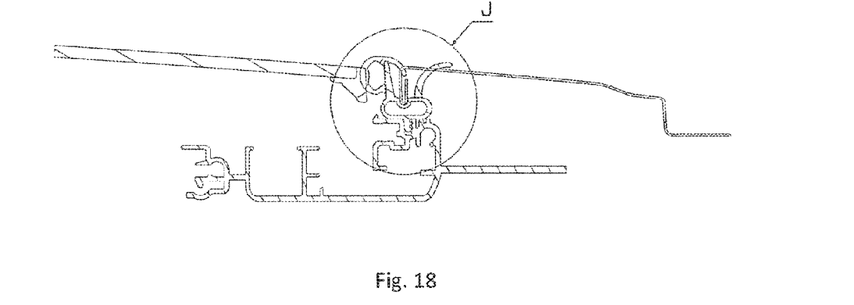
Figure 19:
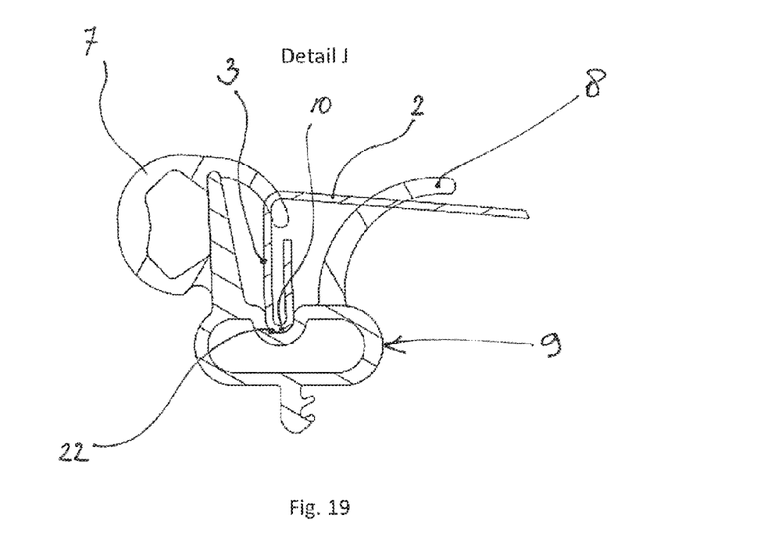

In FIGS. 18 and 19 the embodiment shown for the third seal part 9 provides a predefined channel 22 in the area where the upper part 13 engages the lower part 10 of the roof edge 3 to receive the shape of the lower part 10 of the roof edge 3 in the appropriate position, as seen in a lateral direction.

Figure 20:
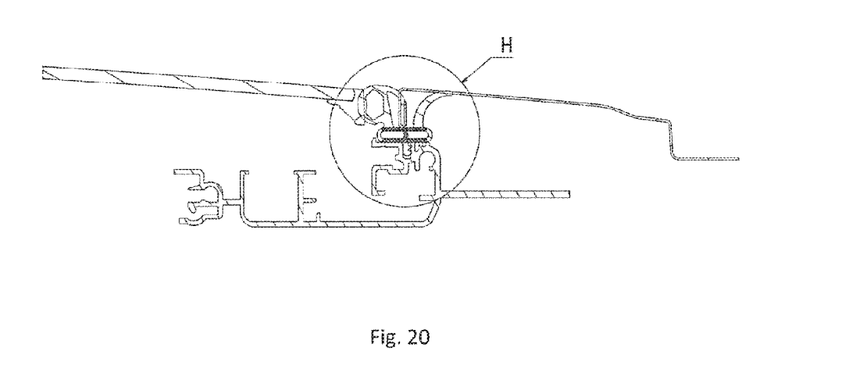
Figure 21:
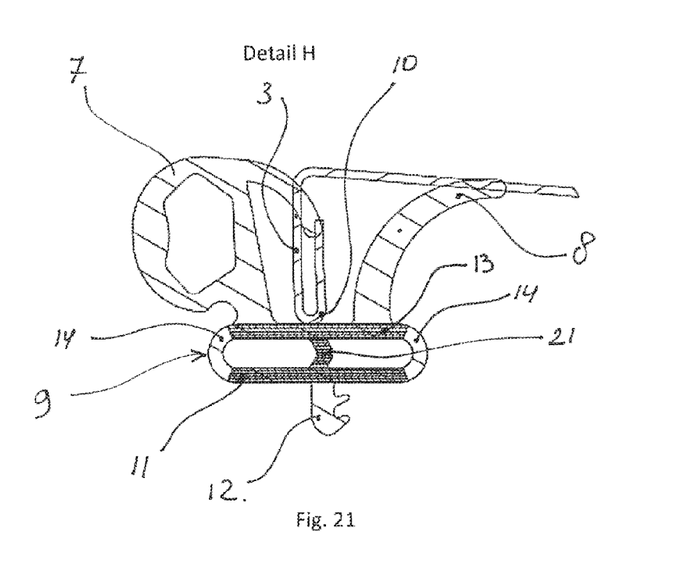

In FIGS. 20 and 21 an embodiment shows the third seal part 9 comprising in between the lateral side parts 14 a connection part 21 between the lower and the upper part 13, the connection part 21 being formed such that it is able to deflect in a lateral direction under the influence of the biasing force of the third seal part 9 and the compression caused by it.

Figure 22:
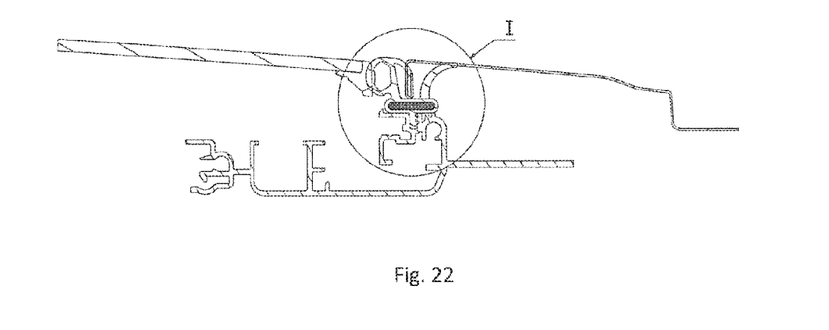
Figure 23:
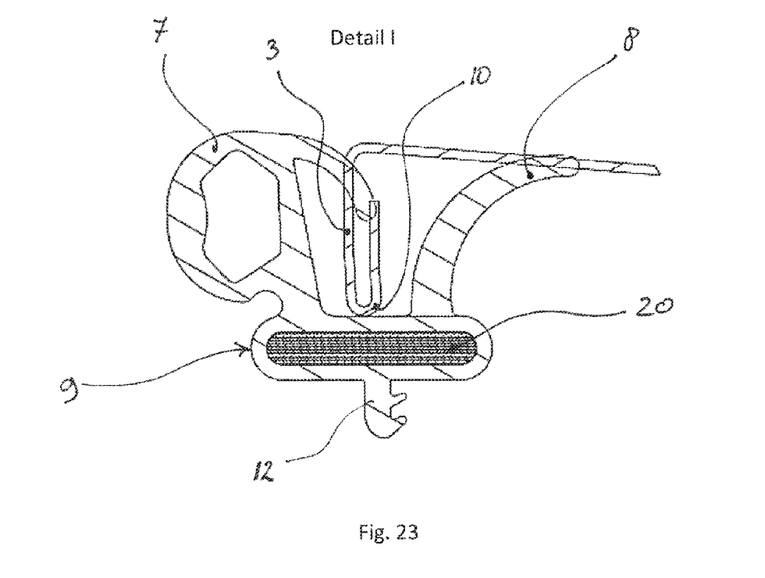

In FIGS. 22 and 23 an embodiment shows the hollow inner part 20 of the third seal part 9 being filled with a cellular rubber from the group of materials known as EPDM, having a low density.

From the foregoing it will be clear that the invention provides a sealing assembly in an open roof construction capable of providing a better visual impression and sealing quality when build into a vehicle.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle having a fixed roof with a roof edge protruding in a downward direction defining a roof opening, the open roof construction further comprising:
    a stationary part having a guide rail extending along at least a longitudinal side of the roof opening;
    at least one panel for at least partly opening and closing the roof opening;
    an operating mechanism, guided in a guide rail of the stationary part, coupled to the panel and configured to move the panel in vertical and longitudinal directions with respect to the roof opening; and
    a sealing assembly provided on the stationary part and comprising:
        a first seal part configured to seal the panel towards a first, outer side of the roof edge of the fixed roof;
        a second seal part configured to seal the stationary part against a second, inner side of roof edge of the fixed roof; and
        a third seal part configured to seal the stationary part against a lower part of the roof edge.

2. The open roof construction according to claim 1, wherein the first and third seal parts are bulb seal parts having a substantially elongated spherical shape and wherein the second seal part has an elongated shape.

3. The open roof construction according to claim 1, wherein the third seal part is subjected to varying distances resulting from a tolerances stack between the stationary part and the lower part of the roof edge while maintaining a closed gap between said parts.

4. The open roof construction according to claim 1, wherein the sealing assembly is mounted to the stationary part and wherein the third seal part is biased in a direction towards the lower part of the roof edge to maintain a sealing against said lower part of the roof edge.

5. The open roof construction according to claim 1, wherein the third seal part comprises a lower part provided with a protruding part by which the sealing assembly is mounted to the stationary part and an upper part extending in a substantially horizontal direction, and further comprises lateral side parts connecting the lower part with the upper part and wherein said upper part is provided with the first and second seal part and said upper part is biased against the lower part of the roof edge, said upper part being substantially stiff in order to inhibit deflection of said upper part.

6. The open roof construction according to claim 5, wherein the upper part comprises a reinforcement integrated into material of the upper part to enhance the stiffness of said upper part.

7. The open roof construction according to claim 5, wherein the third seal part comprises a reinforcement in the form of a C-shaped spring configured to enhance the biasing force of the third seal part to the lower part of the roof edge.

8. The open roof construction according to claim 5, wherein the third seal part and the first seal part comprises a reinforcement integrated in material of the third part to enhance the stiffness of the upper part of the third seal part and to support a position of the first seal part during opening and closing of the panel.

9. The open roof construction according to claim 1, wherein the sealing assembly comprise a material selected from the group of materials known as TPE and/or the group known as EPDM, wherein each of the used materials may have a different hardness.

10. The open roof construction according to claim 5, wherein the upper part of the third seal part comprises an increased hardness in comparison to a remainder of the sealing assembly to enhance the stiffness of the upper part.

11. The open roof construction according to claim 5, wherein a wall thickness of the upper part and the lateral side parts of the third sealing part is increased such that the stiffness of the upper part is enhanced and/or that the biasing force of the upper part is enhanced.

12. The open roof construction according to claim 5, wherein a hollow inner part of the third seal part is filled with a cellular rubber from the group of materials known as EPDM, having a low density.

13. The open roof construction according to claim 5, wherein the third seal part comprises in between the lateral side parts a connection part between the lower and the upper part, said connection part being formed such that it is able to deflect in a lateral direction under an influence of the biasing force of the third seal part and a compression caused by it.

14. The open roof construction according to claim 5, wherein the third seal part in an area where the upper part engages the lower part of the roof edge is provided with a predefined channel to receive the shape of the lower part of the roof edge in an appropriate position, as seen in a lateral direction.

15. The open roof construction according to claim 5, wherein the second seal part and the third seal part comprises a reinforcement integrated in material of the second part to enhance the stiffness of the upper part of the second seal part and to support a position of the second seal part towards the inner side of the roof edge of the fixed roof.

16. The open roof construction according to claim 5, wherein the sealing assembly in an area between the connections of the first and the second seal part to the upper part of the third seal part forms a drain gutter able to collect water which may leak from the sealing between the panel and the fixed roof and wherein the sealing assembly at each longitudinal end is connected to a drainage member configured to discharge water from the drain gutter.

17. The open roof construction according to claim 5, wherein the first and second seal part and the upper part of the third seal part comprises a reinforcement for enhancement of support for the first and second seal parts and for reinforcement of the upper part of the third seal part to avoid deflection of said part.

18. An open roof construction for a vehicle having a fixed roof with a roof edge protruding in a downward direction, the roof edge having a first inner side and an opposite second outer side, defining a roof opening, the open roof construction further comprising:
- a stationary part having a guide rail extending along at least a longitudinal side of the roof opening;
- at least one panel for at least partly opening and closing the roof opening;
- an operating mechanism, guided in a guide rail of the stationary part, coupled to the panel and configured to move the panel in vertical and longitudinal directions with respect to the roof opening; and
- a sealing assembly provided on the stationary part and comprising:
  - a first seal part and a second seal part configured to engage the roof edge therebetween, the first seal part configured to seal the panel towards the outer side of the roof edge, the second seal part configured to seal the stationary part against the first inner side of the roof edge; and
  - a third seal part configured to seal the stationary part against a lower part of the roof edge.

\* \* \* \* \*